(12) United States Patent
Pinto et al.

(10) Patent No.: US 6,532,834 B1
(45) Date of Patent: Mar. 18, 2003

(54) CAPACITIVE PRESSURE SENSOR HAVING ENCAPSULATED RESONATING COMPONENTS

(75) Inventors: Gino A. Pinto, Milford, MA (US); Dennis K. Briefer, Berlin, MA (US)

(73) Assignee: Setra Systems, Inc., Boxboro, MA (US)

( * ) Notice: Subject to any disclaimer, the term of this patent is extended or adjusted under 35 U.S.C. 154(b) by 0 days.

(21) Appl. No.: 09/369,573

(22) Filed: Aug. 6, 1999

(51) Int. Cl.[7] .............................. G01L 1/12; G01L 9/12; H01G 7/00
(52) U.S. Cl. ................. 73/862.626; 73/718; 361/283.3; 361/283.4
(58) Field of Search .................... 73/774, 724, 718, 73/780, 862.626; 361/283.1, 283.2, 283.3, 283.4

(56) References Cited

U.S. PATENT DOCUMENTS 4,127,110 A * 11/1978 Bullara .................... 73/718
4,730,496 A * 3/1988 Knecht et al. ............ 73/724

* cited by examiner

Primary Examiner—William Oen
Assistant Examiner—Maurice Stevens

(57) ABSTRACT

A capacitive pressure sensor for measuring a pressure applied to an elastic member includes a capacitive plate disposed adjacent to the elastic member so as to define a gap between a planar conductive surface of the elastic member and a corresponding planar surface of the capacitive plate. The gap, capacitive plate and elastic member together define a capacitor having a characteristic capacitance. The sensor further includes an elongated electrical conductor characterized by an associated inductance value. The conductor is fixedly attached to and electrically coupled with the capacitive plate. The gap between the capacitive plate and the elastic member varies as a predetermined function of the pressure applied to the elastic member so as to vary the characteristic capacitance. The capacitor and the electrical conductor together form an electrical resonator having a characteristic resonant frequency. Varying the capacitance of this tank circuit varies the resonant frequency of the tank circuit. Thus, the resonant frequency of the tank circuit is indicative of the pressure applied to the elastic member. The close physical proximity of the capacitor and the electrical conductor equalizes the effects of environmental influences such as temperature variations, vibration and shock, thus making such effects more predictable.

31 Claims, 4 Drawing Sheets

CAPACITIVE PRESSURE SENSOR HAVING ENCAPSULATED RESONATING COMPONENTS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

1. Field of the Invention

The present invention relates to a pressure sensor, and more particularly, a pressure sensor which relies on changes in capacitance to indicate pressure fluctuations.

2. Background of the Invention

Capacitive pressure sensors are well known in the prior art. Such sensors typically include a fixed element having a rigid, planar conductive surface forming one plate of a substantially parallel plate capacitor. A displacable (relative to the fixed element) conductive member, such as a metal diaphragm, or a plated non-conductive member, such as a metalized ceramic diaphragm, forms the other plate of the capacitor. Generally, the diaphragm is edge-supported so that a central portion is substantially parallel to and opposite the fixed plate. Because the sensor generally has the form of a parallel plate capacitor, the characteristic capacitance C of the sensor may be approximated by the equation:

$$C = \frac{\epsilon A}{d} \quad (1)$$

where $\epsilon$ is the permittivity of the material between the parallel plates, A is the surface area of the parallel plate and d represents the gap between the plates. The characteristic capacitance is inversely proportional to the gap between a central portion of the diaphragm and the conductive surface of the fixed element. In order to permit a pressure differential to develop across the diaphragm, the region on one side of the diaphragm is sealed from the region on the opposite side.

In practice, the diaphragm elasticity is selected so that pressure differentials across the diaphragm in a particular range of the interest cause displacements of the central portion of the diaphragm. These pressure differential-induced displacements result in corresponding variations in the gap, d, between the two capacitor plates, and thus in capacitance variations produced by the sensor capacitor. For relatively high sensitivity, such sensors require large changes of capacitance in response to relatively small gap changes. Regarding equation (1), if $\epsilon$ and A are held constant, the greatest slope of the d verses C plot occurs when d is small. Thus, for the greatest sensitivity, the gap is made as small as possible when the device is in equilibrium and the sensor is designed so that the gap d changes as pressure is applied. The multiplicative effect of $\epsilon$ and A increases the sensitivity of the d to C relationship, so $\epsilon$ and A are maximized to achieve the highest possible sensitivity.

In a typical prior art embodiment, the sensor capacitor formed by the fixed conductive surface and the diaphragm is electrically coupled via conductors to an oscillator circuit. The oscillator circuit typically includes an inductor that forms a tank circuit with the remotely located sensor capacitor. This LC tank circuit provides a frequency reference for the oscillator circuit; the output frequency of which is a direct function of the resonant frequency of the tank circuit. The resonant frequency of the tank circuit is in turn a direct function of the inductance L of the inductor and the capacitance C of the sensor capacitor. It is well known to those in the art that the resonant frequency $\omega_0$ of a simple LC tank circuit is given by $$\omega_0 = \frac{1}{\sqrt{LC}}.$$

As long as the values of the inductor and the capacitor both remain fixed, the output frequency of the oscillator circuit remains constant. However, since the capacitance of the sensor capacitor varies as a function of the pressure applied to the diaphragm, the output frequency of the of the oscillator circuit also varies as a direct function of the applied pressure.

Such a configuration produces a signal whose frequency is indicative of the pressure applied to the remote sensor. One disadvantage to this configuration is that having the capacitive sensor located remotely can introduce environmentally induced errors in the expected resonant frequency of the tank circuit. For example, it is well known to those in the art that the inductance value L of an inductor and the capacitance value C of a capacitor are each temperature dependent to some extent, depending upon the design of each particular physical component. The effect of the temperature on the capacitance or inductance of a particular component is often quantified as the "temperature coefficient" associated with that component. It is possible to design a component so as to minimize the temperature coefficient, thus rendering the value of the device relatively insensitive to temperature, but commercially available components typically do have a measurable temperature coefficient which affects the component performance. It is also possible to choose components whose temperature coefficients are complementary, such that the net effect of a temperature change to the components together is nominally zero. However, when two components are not located together, such as the capacitive sensor and the inductor in the oscillator circuit, the ambient temperatures are often different, and complementary temperature coefficients do not produce a nominally zero sensitivity to temperature changes.

Another disadvantage to having a remotely located capacitive sensor is that the conductors used to electrically couple the sensor to the oscillator circuit introduce stray capacitances and inductances to the basic LC tank circuit. This disadvantage could be mitigated and thus acceptable if the stray values remained constant, but the stray values can change with environmental factors, physical movement of the conductors, etc.

It is an object of the present invention to substantially overcome the above-identified disadvantages and drawbacks of the prior art.

SUMMARY OF THE INVENTION

The foregoing and other objects are achieved by the invention which in one aspect comprises a capacitive sensor for measuring a pressure applied to a conductive, elastic member, or a plated non-conductive elastic member, having at least a first substantially planar surface and being supported on at least one edge. The sensor includes a housing for supporting the elastic member by its edge, thereby forming (i) a controlled pressure chamber disposed on the side of the elastic member corresponding to the first planar surface, and a variable pressure region disposed on the side of the elastic member opposite said first side. The sensor also includes a capacitive plate disposed substantially adjacent to the elastic member so as to define a gap between the first planar surface and a corresponding planar surface of the capacitive plate. The gap, capacitive plate and elastic member together define a capacitor having a characteristic capacitance. The sensor further includes an elongated electrical conductor characterized by an associated inductance value. The conductor is fixedly attached to and electrically coupled with the capacitive plate. The gap between the capacitive plate and the elastic member varies as a predetermined function of the pressure applied to the elastic member so as to vary the characteristic capacitance. The capacitor and the electrical conductor together form a tank circuit having a characteristic resonant frequency; varying the capacitance of this tank circuit varies the resonant frequency of the tank circuit. Thus, the resonant frequency of the tank circuit is indicative of the pressure applied to the elastic member.

In another embodiment of the invention, the pressure applied to the elastic member is generated by a pressure differential across (i) the first planar surface of the elastic member and (ii) a second planar surface of the elastic member disposed substantially parallel to the planar surface. In one embodiment, this pressure differential is the result of a constant, controlled environment being in contact with the first planar surface, along with a fluid under pressure being in contact with the second planar surface of the elastic member.

In another embodiment, the electrical conductor is disposed in a spiral configuration within a plane substantially parallel to the capacitive plate.

In a further embodiment, the sensor further includes an insulator disposed between the capacitor plate and the electrical conductor. The insulator may be fixedly attached to either the capacitor plate, the electrical conductor, or both.

In another embodiment, the sensor further includes a stiffening element fixedly attached to the capacitive plate and the conductive element.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
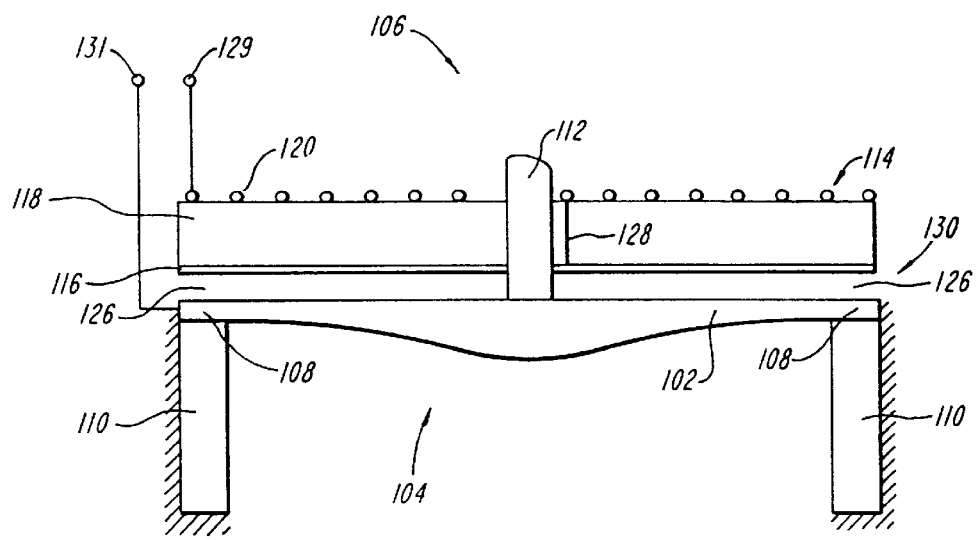
FIG. 1 shows a sectional view of one preferred embodiment of a capacitive pressure sensor.
Figure 2:
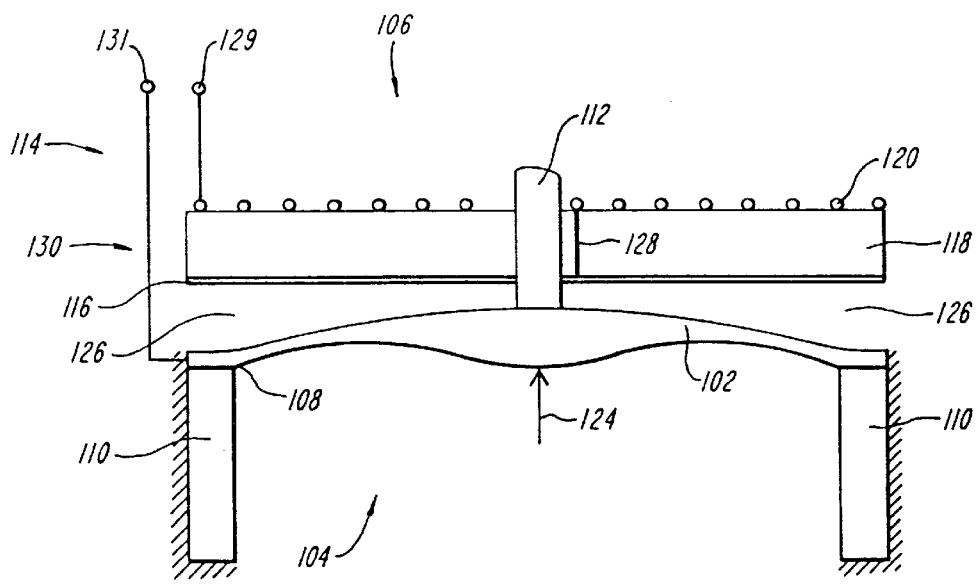
FIG. 2 shows the capacitive sensor of FIG. 1 with a higher pressure in the variable pressure region than the controlled pressure region.

FIG. 1 shows a sectional view of one preferred embodiment of a capacitive pressure sensor 100 constructed in accordance with the present invention, which produces a characteristic capacitance proportional to a pressure (e.g., pressure via a fluid medium) applied to the sensor 100. Sensor 100 includes an electrically conductive, elastic member 102 that forms a physical boundary between a variable pressure region 104 and a controlled pressure region 106. FIG. 2 shows the capacitive sensor of FIG. 1 with a higher pressure present in the variable pressure region 104 than the controlled pressure region 106. The elastic member 102 is supported at its periphery 108 by a support member 110. The support member 110 may include, or be integral with, the pressure sensor 100 housing, as is disclosed and described in detail in U.S. Pat. No. 5,442,962, assigned to the assignee of the subject invention and is hereby incorporated by reference.

In this embodiment, the planar surface of the elastic member 102 is substantially circular, although alternate embodiments may incorporate other shapes. A connection post 112 for supporting an electrode assembly 114 is fixedly attached to the elastic member 102. The connection post 112 may be attached to the elastic member 102 by brazing, soldering, welding, gluing, press fit, stud mount, or by other securing methods known to those in the art. The cross section of the elastic member 102 (shown in FIG. 1) is somewhat greater (i.e., thicker) at the center, as compared to the perimeter, to provide a foundation for attaching the connection post 112. Other elastic member 102 cross sections may be used to provide similar results. Similarly, the electrode assembly 114 may be attached to the connection post 112 by brazing, soldering, gluing, press fit, stud mount, or by other methods of securing components known to those in the art.

Figure 3A:
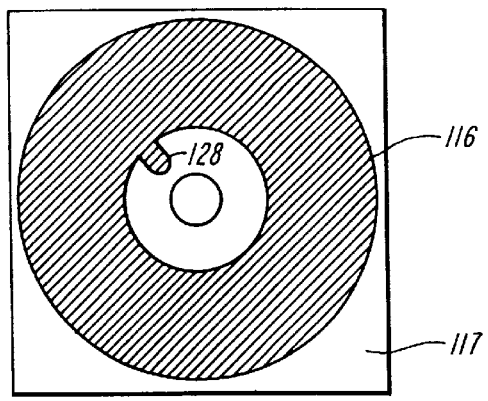
FIG. 3A shows a bottom view of the capacitor plate.

The electrode assembly 114 includes a capacitor plate 116, an insulator 118 and a planar inductor coil 120. The capacitor plate 116, a bottom view of which is shown in FIG. 3A, is shaped, sized and contoured to substantially match the planar surface of the electrically conductive elastic member 102. In a preferred embodiment, the capacitor plate 116 includes a sheet of copper, silver or gold bonded to an insulating base 117 such as fiberglass, polyimide, glass, or ceramic, although other electrically conductive materials and other insulating materials known to those in the art may be used to form the capacitor plate 116 and the insulating base 117, respectively. Alternately, the capacitor plate 116 may be etched from a copper-clad substrate, or screened and fired using thick-film techniques, using procedures well known for the fabrication of printed circuits.

The insulator 118 may include a separate piece of insulating material bonded to and contiguous with the capacitor plate 116 and the inductor coil 120, or it may include an extension of the insulating base from the capacitor plate 116. The insulator 118 may include fiberglass, polyimide, ceramic, or other insulating materials known to those in the art.

Figure 3B:
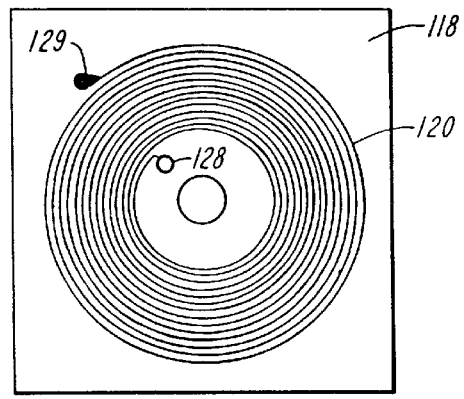
FIG. 3B shows a top view of the inductor coil.

A preferred embodiment of the inductor coil 120, a top view of which is shown in FIG. 3B, includes an elongated electrical conductor wound in a spiral form within a plane that is substantially parallel to the capacitor plate 116. As with the capacitive plate 116, the inductor coil 120 may be etched from a sheet of conductive foil bonded to an insulator 118, using printed circuit board techniques well known to those in the art. Alternatively, the coil may be screened and fired using thick-film techniques well known to those in the art. In other embodiments, the coil 120 may include a single long conductor, wound in the shape shown in FIG. 3B and bonded to an insulator 118. Other methods of fabricating the coil 120 known to those in the art (e.g., vapor deposition, photoetching, etc.) may also be used, as long as the resulting coil 120 provides the inductive properties described herein. The end of the coil 120 shown in FIG. 3B is electrically coupled to a plated through-hole 128 that passes through the insulator 118. The plated through-hole 128 is also electrically coupled to the capacitor plate 116; the coil 120 is thus electrically coupled to the capacitor plate 116. In alternate embodiments, this electrical coupling between the coil 120 and the capacitive plate 116 may be accomplished by an electrical conductor passing through the insulator 118, by a conductor wrapping around the side of the insulator 118, or by other methods known to those in the art.

The capacitive plate 116, the conductive elastic member 102 and the gap 126 formed between the capacitive plate 116 and the elastic member 102 form a capacitor 130 having a characteristic capacitance. In general, the characteristic capacitance of such a structure is directly proportional to the areas of the capacitive plate 116 and the elastic member 102, and inversely proportional to the distance between the capacitive plate 116 and the elastic member 102.

In a preferred embodiment of the invention, the pressure sensor 100 senses a pressure applied to the elastic member via a fluid medium present in the variable pressure region 104. The pressure in the controlled pressure region 106 may be ambient atmospheric pressure (i.e., simply exposed to the "open air") or it may be more precisely controlled with respect to a constant pressure reference. A difference in pressure across the two regions 104 and 106 produces a net differential pressure 124 on the elastic member 102. When the variable pressure region 104 is greater than the controlled pressure region 106, the direction of the elastic member displacement is from the variable pressure region 104 to the controlled pressure region 106, as shown in FIG. 2. A change of ambient pressure in the variable pressure region 104 produces a corresponding change in the amount of displacement of the elastic member 102. FIG. 1 shows the elastic member 102 in a neutral displacement position; i.e., when the differential pressure across the elastic member 102 is substantially zero. In the neutral displacement position, a substantially uniform gap 126 exists between the capacitive plate 116 and the elastic member 102. FIG. 2 shows the elastic member 102 displaced toward the controlled pressure region 106, such that the elastic member 102 presents a convex surface in the controlled pressure region 106. In this convex displacement position, a non-uniform gap 126 exists between the capacitive plate 116 and the elastic member 102. The width of the non-uniform gap 126 near the connection post 112 is substantially the same as the uniform gap 126 in the neutral displacement position, and the width of the non-uniform gap 126 increases as the distance from the post 112 increases. The increase in the gap 126 distance as the elastic member 102 displaces toward the controlled pressure region 106 produces a decrease in the characteristic capacitance. Thus, the characteristic capacitance of the capacitor 130 formed by the capacitive plate 116, the conductive elastic member 102 and the gap between them is inversely proportional to the magnitude of the differential pressure 124 applied to the elastic member 102.

Figure 4A:
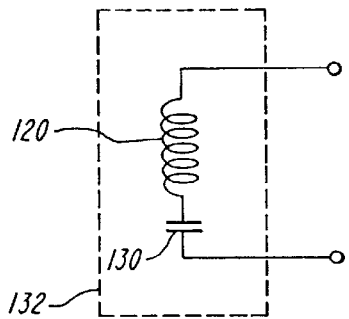
FIG. 4A shows the capacitor and the inductor coil connected as a series resonant tank circuit.
Figure 4B:
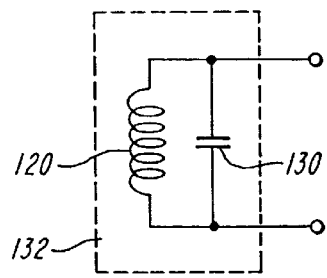
FIG. 4B shows the capacitor and the inductor coil connected as a parallel resonant tank circuit.

In one embodiment of the invention, the capacitor 130 is electrically coupled in series to the inductive coil 120 so as to form a series resonant tank circuit 132 having a resonant frequency $$\omega_0 = \frac{1}{\sqrt{LC}}$$

as shown schematically in FIG. 4A.

Figure 5:
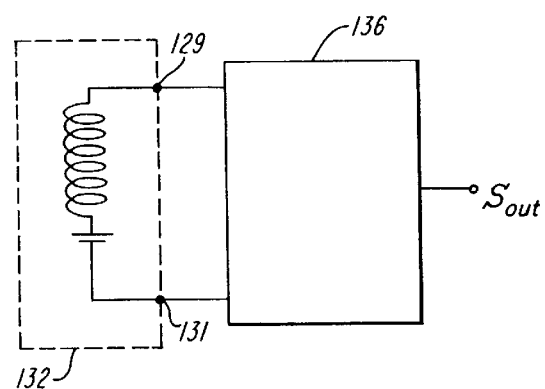
FIG. 5 shows the tank circuit of FIG. 4A connected to an oscillator circuit.

Alternately, the capacitor 130 may be electrically coupled in parallel to the inductive coil 120 so as to form a parallel resonant tank circuit 132 having a resonant frequency $$\omega_0 = \frac{1}{\sqrt{LC}}$$

as shown schematically in FIG. 413. In either case, the tank circuit (132 or 134) is electrically coupled to an oscillator circuit 136 that uses the tank circuit 132 as a frequency reference, as shown in FIG. 5 for a series resonant tank circuit 132. The oscillator circuit 136 is electrically coupled to the tank circuit 132 via conductors electrically coupled to inductor terminal 129 and capacitor terminal 131. The output of the oscillator circuit is a signal $S_{OUT}$ having a frequency of $$\omega_{OUT} = \frac{1}{\sqrt{LC}},$$

thus the capacitance C is a function of the frequency; i.e., $$C = \frac{1}{\omega_{OUT}^2 L}.$$

Since the characteristic capacitance of the capacitor 130 is directly proportional to the magnitude of the differential pressure 124 applied to the elastic member 102, the frequency $\epsilon_{OUT}$ of the output signal $S_{OUT}$ is also a function of the magnitude of the differential pressure 124. The close mutual proximity of the inductive coil 120 and the capacitor 130 ensures similar environmental conditions for both components of the tank circuit 132.

Figure 6:
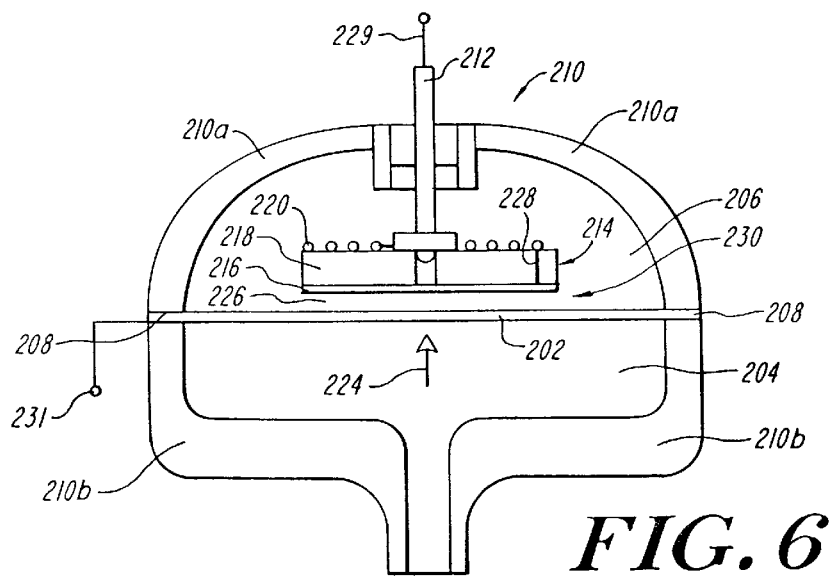
FIG. 6 shows a closing-gap embodiment of the pressure sensor of FIG. 1.

A closing-gap embodiment of a pressure sensor 200, shown in FIG. 6, includes an electrically conductive elastic member 202 secured about its perimeter 208 by a housing 210. In this form of the invention, the housing 210 includes an upper portion 210a and a lower portion 210b, and the elastic member 202 is secured between the two portions at its perimeter 208. The elastic member may be secured by a bonding technique known in the art such as brazing, welding, gluing, etc., or the elastic member may be secured by pressure (i.e., clamping) between the upper portion 210a and the lower portion 210b of the housing 210. As with the embodiment shown in FIG. 1, the elastic member 202 forms a physical boundary between a variable pressure region 204 and a controlled pressure region 206. In the closing-gap embodiment, however, the electrode assembly 214 is not mechanically coupled to the elastic member 202 via a connection post. Rather, the electrode assembly 214 is suspended from the housing 210 by a suspension post 212, such that the electrode assembly 214 is disposed substantially adjacent to the elastic member 202. Because the electrode assembly 214 is not attached to the elastic member 202 in this embodiment, the cross section of the elastic member 202 can be relatively uniform as shown in FIG. 6, as opposed to the non-uniform cross section (i.e., thicker at the center and tapering out toward the perimeter) of the elastic member 102 shown in FIG. 1.

The construction of the electrode assembly 214 in this embodiment is essentially the same as for the form of the invention shown in FIG. 1; the electrode assembly 214 includes a capacitor plate 216, an insulator 218 and a planar inductor coil 220. The inductor coil 220 and the capacitor plate 216 are electrically coupled via the plated through-hole 228. A capacitor 230 having a characteristic capacitance C is formed by the capacitor plate 216, the conductive elastic member 202 and the variable gap 226 formed between the plate 216 and the member 202. Since the areas of the capacitive plate 216 and the elastic member 202 do not vary, the characteristic capacitance C varies only as a function of the gap 226. As a differential pressure 224 is applied to the elastic member 202 in a direction from the variable pressure region 204 toward the controlled pressure region 206, the elastic member deflects toward the electrode assembly 214, so as to be substantially convex in the controlled pressure region. This pressure induced deflection toward the electrode assembly closes the variable gap 226, thereby increasing the characteristic capacitance C. The characteristic capacitance C is thus directly proportional to the magnitude of the differential pressure 124 applied to the elastic member 102 for this embodiment of the invention. Electrical access to the capacitor 230 is gained by a first electrical terminal 229 and a second electrical terminal 231. In one preferred embodiment, the first electrical terminal 229 is electrically coupled to the inductor coil 220 through an electrically conductive suspension post 212, and the second electrical terminal 231 is electrically coupled to the elastic member 202 at its perimeter 208.

Figure 7:
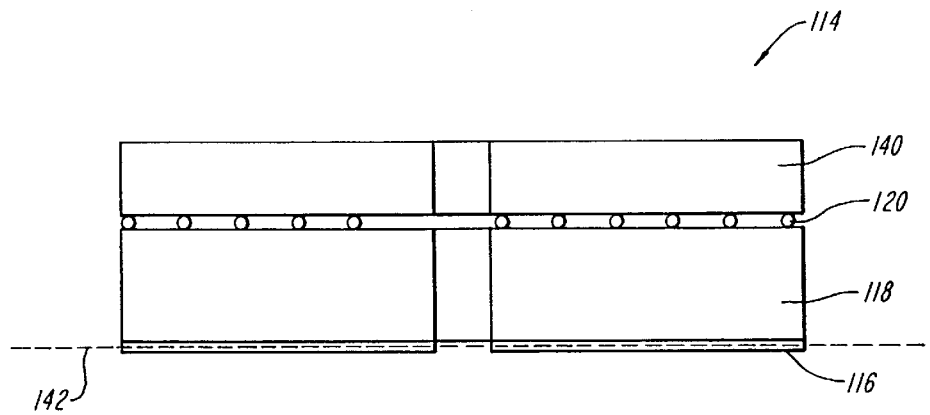
FIG. 7 shows the sensor of FIG. 1 including a stiffening element attached to the electrode assembly.

In one embodiment, the electrode assembly 214 includes a stiffening element 140 as shown in FIG. 7. The stiffening element 140 prevents flexure of the overall electrode assembly, which in turn maintains the capacitor plate 116 within its nominal plane 142. The stability of capacitor 130 of FIG. 1, formed in part by the variable gap 126, is dependant upon the capacitor plate 116 being substantially planar. Flexure of the plate 116 due to temperature variations or other environmental forces (such as vibration and shock) may corrupt the measured value of the characteristic capacitance of the capacitor 130. Any corruption of the characteristic capacitance translates directly to a corruption of the resonant frequency too of the tank circuit 132 and thus to a corruption of the measurement of the differential pressure 124. The stiffening element 140 may include ceramics or other materials that are known to exhibit small amounts of expansion or contraction with respect to ambient temperature variations.

Figure 8:
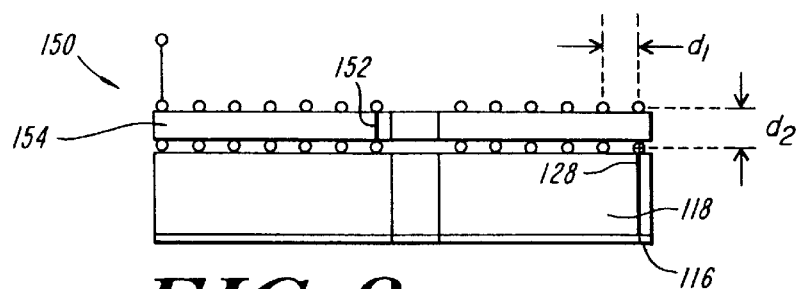
FIG. 8 shows an alternate, multiple layer embodiment of the inductor coil from the sensor of FIG. 1.
Figure 9:
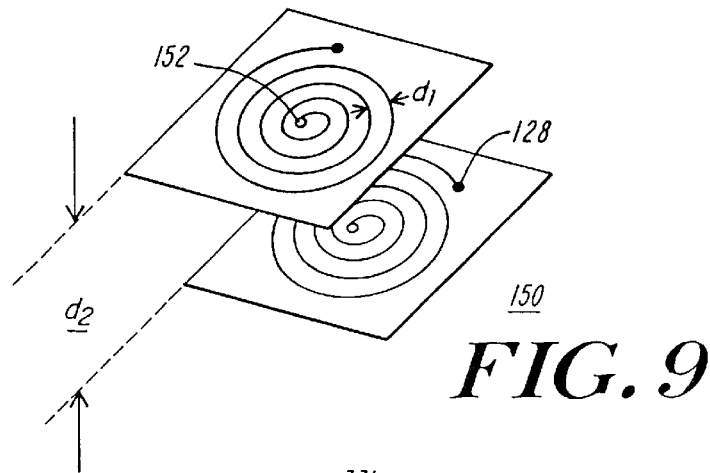
FIG. 9 shows another view of the multiple layer inductor coil shown in FIG. 8; and, FIG. 10 shows another embodiment of the sensor shown in FIG. 1.

In another embodiment of the invention, the inductor coil 120 of FIG. 1 may include a multi-layer inductive coil. The coil 150 shown in FIG. 8 includes two layers of electrical conductor electrically coupled in series via a plated through-hole 152, although alternate embodiments may include any number of layers. The two layers of electrical conductor are bonded to opposite sides of an insulating layer 154, similar to the construction of a multi-layered printed circuit board. One utility of a multiple layer inductive coil 150 is a higher characteristic inductance value due to the increase in the length of the conductor. Another utility of the multiple layer inductive coil 150 is the ability to compensate a variation of the coil's characteristic inductance with respect to temperature variations. It is well known to those in the art that as a planar spiral coil 150 expands in its spiraling plane and the distance d1 between adjacent turns of a single coil increases, the characteristic inductance L of the coil increases (see FIG. 9). It is also well known that as the distance d2 between two coils increases, the characteristic inductance L of the coils decreases. An expansion of the insulating layer due to a temperature change results in a corresponding increase in both d1 and d2. By choosing the appropriate initial dimensions d1 and d2, and by choosing a material for the insulating layer 154 having an appropriate expansion coefficient (with respect to temperature), the changes in characteristic inductance of the coil 150 due to the changes in d1 and d2 can be made to cancel.

Figure 10:
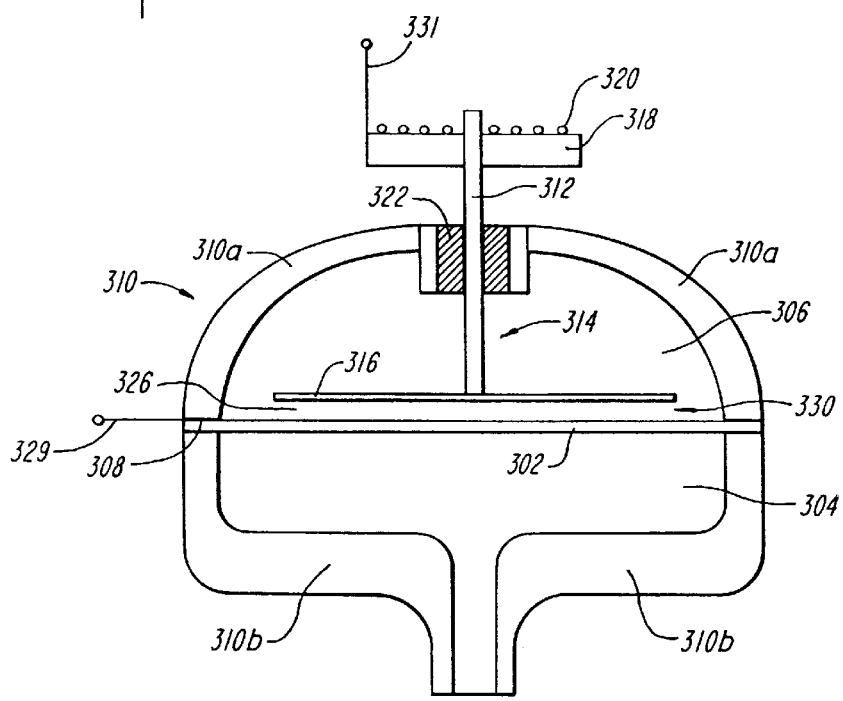

In yet another form of the invention, as shown in FIG. 10, the capacitor 330 portion of the electrode assembly 314 is located within the housing 310, formed by upper portion 310a and lower portion 310b, while the insulator 318 and the inductor 320 portions are disposed outside of the housing 310. An electrically conductive post 312 extends through the upper portion 310a of the housing 310, and is secured in place by a non-conductive sleeve 322. This sleeve 322 electrically isolates the conductive post from the housing 310. Electrical access to the resonator formed by the inductor 320 and the capacitor 330 is gained via a first terminal 329 and a second terminal 331. The first terminal 329 is electrically coupled to the diaphragm 302 at the perimeter 308. The second terminal 331 is electrically coupled to a first end of the inductor 220. The second end of the inductor 220 is electrically coupled to the conductive post 320, as is the capacitive plate 316. Thus, the conductive post serves not only to support the capacitive plate 316 and the inductor 320, but also to electrically couple the inductor 320 to the capacitor 330.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A sensor for measuring a pressure applied to an elastic member having at least a first substantially planar, conductive surface and being supported by at least one edge, comprising:

a housing for supporting said elastic member by said edge, forming (i) a controlled pressure chamber disposed on a first side of said elastic member corresponding to said first planar surface, and (ii) a variable pressure region disposed on a second side of said elastic member opposite said first side;

an electrically conductive, capacitive plate disposed substantially adjacent to said elastic member so as to define a gap between said first planar surface and a corresponding planar surface of said capacitive plate, said gap, capacitive plate and elastic member defining a capacitor having a characteristic capacitance; and, an elongated electrical conductor characterized by an associated inductance value and fixedly attached, along a substantial portion of its entire length, to said capacitive plate;

wherein said capacitor and said elongated electrical conductor are electrically coupled to form a resonant tank circuit, and wherein said gap varies as a predetermined function of said pressure so as to vary said characteristic capacitance, and consequently vary a resonant frequency of said tank circuit.

2. A sensor according to claim 1, wherein said pressure is generated by a pressure differential across (i) said first planar surface of said elastic member and (ii) a second planar surface of said elastic member disposed substantially parallel to said planar surface of said capacitive plate.

3. A sensor according to claim 2, wherein said pressure differential derives from a constant, controlled environment being in contact with said first planar surface and a fluid under pressure being in contact with said second planar surface of said elastic member.

4. A sensor according to claim 1, wherein said electrical conductor is disposed in a spiral configuration within a plane substantially parallel to said capacitive plate.

5. A sensor according to claim 1, further including an insulator disposed between and fixedly attached to said capacitor plate and said electrical conductor.

6. A sensor according to claim 1, further including a stiffening element fixedly attached to said capacitive plate and said conductive element.

7. A sensor according to claim 6, wherein said stiffening element includes a ceramic material.

8. A sensor according to claim 1, wherein said electrical conductor includes at least two layers of electrical conductors separated by alternating layers of insulating material, each said at least two layers of electrical conductors being spirally disposed within a plane parallel to other said layers of electrical conductors and being electrically coupled to adjacent layers of electrical conductors.

9. A sensor according to claim 1, wherein said elastic member is electrically conductive.

10. A sensor according to claim 1, wherein said elastic member is non-electrically conductive and includes a plated surface forming said conductive surface.

11. A sensor according to claim 1, wherein said resonant configuration includes a parallel coupling of said capacitor and said elongated conductor.

12. A sensor according to claim 1, wherein said resonant configuration includes a series coupling of said capacitor and said elongated conductor.

13. A sensor for measuring a pressure applied to an elastic member, comprising:

a housing for supporting said elastic member, forming a controlled pressure region on a first side of said elastic member, and a variable pressure region on a second side of said elastic member;

a capacitive plate disposed substantially parallel to said elastic member so as to define a gap between said first planar surface and a corresponding planar surface of said capacitive plate, said gap, capacitive plate and elastic member defining a capacitor having a characteristic capacitance; and, an elongated electrical conductor characterized by an inductance value and fixedly attached, along a substantial portion of its entire length, to said capacitive plate;

wherein said capacitor and said elongated electrical conductor are electrically coupled to form a resonant tank circuit, and wherein said gap varies as a predetermined function of said pressure so as to vary said characteristic capacitance, and consequently vary a resonant frequency of said tank circuit.

14. A sensor according to claim 13, wherein said pressure is generated by a pressure differential across (i) said first planar surface of said elastic member and (ii) a second planar surface of said elastic member disposed substantially parallel to said planar surface of said capacitive plate.

15. A sensor according to claim 14, wherein said pressure differential derives from a constant, controlled environment being in contact with said first planar surface and a fluid under pressure being in contact with said second planar surface of said elastic member.

16. A sensor according to claim 13, wherein said electrical conductor is disposed in a spiral configuration within a plane substantially parallel to said capacitive plate.

17. A sensor according to claim 13, further including an insulator disposed between and fixedly attached to said capacitive plate and said electrical conductor.

18. A sensor according to claim 13, further including a stiffening element fixedly attached to said capacitive plate and said conductive element.

19. A sensor according to claim 18, wherein said stiffening element includes a ceramic material.

20. A sensor according to claim 13, wherein said electrical conductor includes at least two layers of electrical conductors separated by alternating layers of insulating material, each said at least two layers of electrical conductors being spirally disposed within a plane parallel to other said layers of electrical conductors and being electrically coupled to adjacent layers of electrical conductors.

21. A sensor according to claim 13, wherein said elastic member is electrically conductive.

22. A sensor according to claim 13, wherein said elastic member is non-electrically conductive and includes a plated surface forming said conductive surface.

23. A sensor according to claim 13, wherein said resonant configuration includes a parallel coupling of said capacitor and said elongated conductor.

24. A sensor according to claim 13, wherein said resonant configuration includes a series coupling of said capacitor and said elongated conductor.

25. A sensor for measuring a pressure applied to an elastic member having at least a first substantially planar, electrically conductive surface and being supported by at least one edge comprising:

a housing for supporting said elastic member by said edge, forming (i) a controlled pressure chamber disposed on a first side of said elastic member corresponding to said first planar surface, and (ii) a variable pressure region disposed on a second side of said elastic member opposite said first side;

an electrically conductive, capacitive plate disposed substantially adjacent to said elastic member so as to define a gap between said first planar surface and a corresponding planar surface of said capacitive plate, said gap, capacitive plate and elastic member defining a capacitor having a characteristic capacitance; and, an elongated electrical conductor characterized by an associated inductance value, disposed, along a substantial portion of its entire length, upon a substrate in a substantially planar configuration;

wherein said capacitor and said elongated electrical conductor are electrically coupled to form a resonant tank circuit, and wherein said gap varies as a predetermined function of said pressure so as to vary said characteristic capacitance, and consequently vary a resonant frequency of said tank circuit.

26. A sensor according to claim 25, wherein said capacitive plate is disposed within said housing and said elongated conductor is disposed outside of said housing.

27. A sensor according to claim 25, wherein said capacitive plate and said elongated conductor are each electrically coupled to a conductive post.

28. A sensor according to claim 27, wherein said conductive post extends through and is fixedly attached to said housing via an electrically non-conductive sleeve, said capacitive plate is fixedly attached to a portion of said post extending into said housing, and said elongated conductor is fixedly attached to a portion of said post extending out of said housing.

29. A sensor according to claim 25, wherein said elongated conductor is fixedly attached to an insulating substrate.

30. A sensor according to claim 25, wherein said resonant configuration includes a parallel coupling of said capacitor and said elongated conductor.

31. A sensor according to claim 25, wherein said resonant configuration includes a series coupling of said capacitor and said elongated conductor.

* * * * *